United States Patent Office 2,768,064
Patented Oct. 23, 1956

2,768,064

PREPARATION OF ALKALI METAL HYDRIDES

Henry D. Baldridge, Rockville, Md., assignor to Callery Chemical Company, Pittsburgh, Pa., a corporation of Pennsylvania No Drawing. Application July 6, 1954,
Serial No. 441,631

8 Claims. (Cl. 23—204)

This invention relates to the preparation of alkali metal hydrides such as sodium hydride and more particularly to the preparation of such hydrides from an alkali metal and hydrogen using an improved catalyst or dispersing agent.

Alkali metal hydrides such as sodium hydride are generally prepared by the direct reaction of alkali metals with hydrogen at elevated temperatures. Various modifications of this process are disclosed in the patent literature. Sodium hydride, however, is a solid at the usual reaction temperatures and forms a coating on the metallic sodium which makes the absorption of hydrogen incomplete unless special means are employed to disperse the liquid sodium. In Freudenberg et al., U. S. Patent 1,796,265, a molten alkali metal was mixed with a finely divided solid inert material and the mixture reacted with hydrogen at an elevated temperature. In Hansley, U. S. Patents 2,372,670, 2,372,671 and 2,504,927, there are disclosed various dispersing or surface active agents which when added to the reaction mixture materially increase the reaction rate. These agents include materials such as fatty acids with more than 8 carbon atoms and salts thereof, various alkali metal hydrocarbides and hydrocarbons capable of reacting with alkali metals to form hydrocarbides, and acetylenic hydrocarbons and reaction products of an alkali metal and acetylenic hydrocarbons. Specifically, the following compounds have been claimed to be effective as dispersing agents in the manufacture of sodium hydride from sodium and hydrogen: stearic acid, magnesium stearate, cymene, acetylene, sodium acetylide, and other hydrocarbides of sodium.

It is one object of this invention to provide an improved process for the preparation of alkali metal hydrides such as sodium hydride by reacting an alkali metal with hydrogen. Another object is to improve the yield of sodium hydride obtained by using a more effective catalyst or dispersing agent to promote the reaction of sodium with hydrogen. Other objects will become apparent from time to time throughout the specification and claims as hereinafter related.

Although several materials have been disclosed as dispersing agents for liquid sodium and other alkali metals in the preparation of sodium hydride and other alkali metal hydrides it is not true that all dispersing agents are effective for this purpose. For example, stearic acid is an effective dispersing agent for liquid sodium in the preparation of sodium hydride while 12-hydroxy stearic acid is ineffective. There is some evidence from experimental work with substituted fatty acids which indicates that this class may not be as effective as previously thought. Several other materials which are known dispersing agents for liquid sodium were tested and found to be ineffective in the preparation of sodium hydride as is shown by the data hereinafter set forth.

This invention is based on the discovery that abietic acid ($C_{19}H_{29}COOH$) when added in an amount equal to 0.1% to 5.0% of the weight of the sodium or other alkali metal reacted is highly effective as a catalyst in the preparation of sodium hydride and other alkali metal hydrides from liquid alkali metals and hydrogen.

Abietic acid is a rosin acid and has been found to be much more effective than fatty acids which have previously been used in catalyzing the reaction of sodium and hydrogen. The reaction of sodium and hydrogen was studied to determine the effect of various proposed catalysts on the reaction. The reaction was carried out at constant temperature and pressure and the variations in reaction rate were used as indices of the effectiveness of various catalysts.

In carrying out various experiments on the preparation of sodium hydride the reactions were carried out in a closed bomb under a constant hydrogen pressure of 5 p. s. i. g. at a temperature of 345° C. An inert dispersant (or heel) such as sand or preformed sodium hydride was introduced into the bomb together with a predetermined amount of sodium and 3% by weight of catalyst based on the sodium. A hydrogen atmosphere was then applied to the bomb and the temperature raised to the desired reaction temperature. When the temperature passed the melting point of sodium the mixture was agitated by a low speed agitator. The hydrogen was supplied from a high pressure cylinder through a constant pressure reducing valve and the reaction rate determined by measuring the decrease in hydrogen pressure at the cylinder.

As was above stated the effect of various catalysts on the reaction of sodium and hydrogen to give sodium hydride was determined by measuring the reaction rate at constant pressure and temperature. Since the starting time of the reaction was uncertain and the plot of percentage completion versus time did not indicate a consistent reaction order, no rate constants could be calculated. Therefore, an arbitrary calculation was made over what seemed to be the most reliable portion of the reaction to indicate the relative merits of various proposed catalysts. The percentage reaction per minute was calculated over the range of 40 to 60% completion and this value used as a rate reference number for comparison of the various catalysts tested:

$$\text{Rate reference No.} = \frac{(60-40)\% \text{ completion}}{\text{Time required for the reaction to go from 40 to 60}\% \text{ completion}}$$

Using the procedure described above the reaction rates of sodium and hydrogen on a sand heel at 345° C. were measured with various catalysts and the results shown in Table I were obtained. In each case the catalyst weight was 3% of the weight of sodium used.

Table I

| Catalyst | Reaction Rate Reference No. |
|---|---|
| None | 0.54. |
| Tallow nitrile | Did not reach 60% completion. |
| Butyl alcohol | Do. |
| Isoamyl alcohol | Do. |
| Sodium borohydride | Do. |
| Silicone Grease | Do. |
| 12-hydroxystearic acid | Do. |
| Isopropyl ether | 0.45. |
| Terpineol | 0.87. |
| Pyridine | 1.05. |
| Stearic Acid | 1.33. |
| Abietic Acid | 2.84. |

From the foregoing data it can readily be seen that abietic acid is vastly superior to stearic acid as a catalyst for increasing the reaction rate between sodium and hydrogen in the preparation of sodium hydride.

In another series of experiments the original sand heel was progressively diluted with sodium hydride in successive experiments. Abietic acid was used as the catalyst (3% by weight of the sodium charged) at a temperature of 345° C. and a hydrogen pressure of 5 p. s. i. g. The reaction rate number as well as the yield of sodium hydride was determined in these experiments and the results are set forth in Table II.

*Table II*

| Run No. | Heel Wt. g. | Sand, Approx. Percent | Na Charged Wt. g. | Starting Temp., °C. | Percent Yield NaH | Reaction Rate No. |
|---|---|---|---|---|---|---|
| 1 | 20 | 100 | 20 | 345 | 71 | 5.0 |
| 2 | 40 | 50 | 40 | 335 | 97 | 4.0 |
| 3 | 80 | 25 | 60 | 320 | 94.5 | 3.6 |
| 4 | 20 | 14 | 20 | 295 | 96.0 | 4.0 |
| 5 | 40 | 7 | 40 | 230 | 96.5 | 4.0 |

The starting temperature was the approximate temperature at which the reaction rate became appreciable. The percent yield was based on the total amount of hydrogen absorbed during the run. The reaction rate number was the percent of reaction per minute between 40 and 60% completion at the operating temperature. It is apparent from the above data that high yields of sodium hydride can be obtained by using abietic acid as a catalyst. Furthermore, the yield of sodium hydride, is considerably higher when preformed sodium hydride is used as a heel for starting the reaction than when sand alone is used. These data and other experiments indicate that abietic acid is not only a superior catalyst in terms of reaction rate but also makes it possible to carry out this reaction at very low temperatures (as low as 200° C.) compared to the reaction temperatures (300° to 350° C.) previously required. The upper limit of temperature for carrying out this reaction is determined by the dissociation of sodium hydride but for all practical purposes is about 450° C.

Having thus described this invention in conformity with the patent laws what is desired to be claimed and secured by Letters Patent of the United States is:

1. A method of preparing alkali metal hydrides which comprises mixing an alkali metal with a finely divided inert solid and a relatively small amount of abietic acid and subjecting the mixture to the action of hydrogen at a temperature above the melting point of the alkali metal.
2. A method according to claim 1 in which abietic acid is present in an amount equal to 0.1% to 5% by weight based on the weight of alkali metal charged.
3. A method according to claim 1 in which the alkali metal is sodium.
4. A method according to claim 1 in which the reaction temperature is 200° to 450° C.
5. A method of preparing sodium hydride which comprises continuously agitating a mixture of sodium metal and a finely divided inert solid carrier at a temperature of 200° to 450° C. in the presence of a small amount of abietic acid and under a hydrogen atmosphere.
6. A method according to claim 5 in which the abietic acid is present in an amount equal to 0.1% to 5% by weight based on the weight of sodium metal charged.
7. A method according to claim 5 in which the solid carrier is sodium hydride.
8. A method according to claim 6 in which the solid carrier is sodium hydride.

References Cited in the file of this patent
UNITED STATES PATENTS 2,482,574    Bogrow et al. ---------- Sept. 20, 1949

OTHER REFERENCES

Hurd: "Chemical of the Hydrides," 1952, pages 30–31.